United States Patent [19]

Brendzel

[11] Patent Number: 5,502,763
[45] Date of Patent: Mar. 26, 1996

[54] TELECOMMUNICATIONS SERVICE ACCESS ARRANGEMENT

[75] Inventor: Henry T. Brendzel, Millburn, N.J.

[73] Assignee: AT&T Corp., Murray Hill, N.J.

[21] Appl. No.: 330,467

[22] Filed: Oct. 28, 1994

[51] Int. Cl.⁶ .................................................. H04M 3/42
[52] U.S. Cl. ........................... 379/211; 379/201; 379/214
[58] Field of Search .................................. 379/201, 211, 379/214, 333, 334, 335, 336, 337

[56] References Cited

U.S. PATENT DOCUMENTS 4,436,962  3/1984  Davis et al. ........................ 379/214 X Primary Examiner—Jeffery Hofsass
Assistant Examiner—Harry S. Hong
Attorney, Agent, or Firm—Henry T. Brendzel

[57] ABSTRACT

A call processing method that allows users to dial their own number, and the number is interpreted as a request for connection to a means for providing enhanced services. The process includes the step of comparing the called party's number to the number of the calling party, and responding to the condition that the two numbers to the same by connecting the calling party to the aforementioned means.

14 Claims, 1 Drawing Sheet

TELECOMMUNICATIONS SERVICE ACCESS ARRANGEMENT

BACKGROUND OF THE INVENTION

1. Field of the Invention

This invention relates to telecommunication services and, more particularly, to means and methods for accessing telecommunication services.

2. Description of Prior Art

The telephone arts have progressed to the point where many sophisticated features are provided to users in addition to "plain old telephone service" (POTS) which merely connects a calling party to a called party. One such feature, for example, permits diversion of an incoming call when the called party is already busy with another conversation. This is a capability that is not available with POTS service even when users employ a customer premises telephone answering system (since the latter works only when the called party is unavailable).

It is expected that, in the near future, the inter-exchange carriers will wish to offer the very same features that are currently offered by the local exchange carriers. Indeed, it is expected that all carriers will desire to offer many multi-media services. The inter-exchange carriers currently do not have a direct coupling to the customers. Therefore, customers must dial a specific number in order to reach enhanced telecommunication services offered by inter-exchange carriers. The problem is that such an approach requires users to remember and use a number that, perhaps, is difficult to remember and varies from locale to locale. Moreover, once that number is reached, the calling party must identify itself. It would be advantageous to have a number that is easy to remember and, at the same time, is unique.

SUMMARY

The problem of requiring users to call a specific number in order to acquire some subscribed-to capability is obviated by providing a call processing method, that allows users to dial their own number, with or without a prefix, and the number is interpreted appropriately. The method comprises the steps of ascertaining the fact that the dialed number, which presumably is the desired destination of a call, is also the number that corresponds to the source from which the dialed number originates. Responsive to such a condition, the calling party is connected to enhanced services.

DETAILED DESCRIPTION

The basic notion of this disclosure involves a calling party assessing a telecommunication instrument, dialing the number designated for that telephone instrument and, thereby, connecting the telephone instrument to the features and services that are reserved for that number. This includes, for example, features such as retrieving telephone messages that were previously recorded. More broadly, in response to such dialing, the telephone instrument can be connected to a completely separate service (and/or separate equipment) that offers a plethora of services. For instance, connection can be made to a service center of AT&T, which would retrieve calls made to the calling party's number, and then offer any other service that the calling party may desire, including sophisticated multi-media services or a simple POTS connection to some third party.

Figure 1:
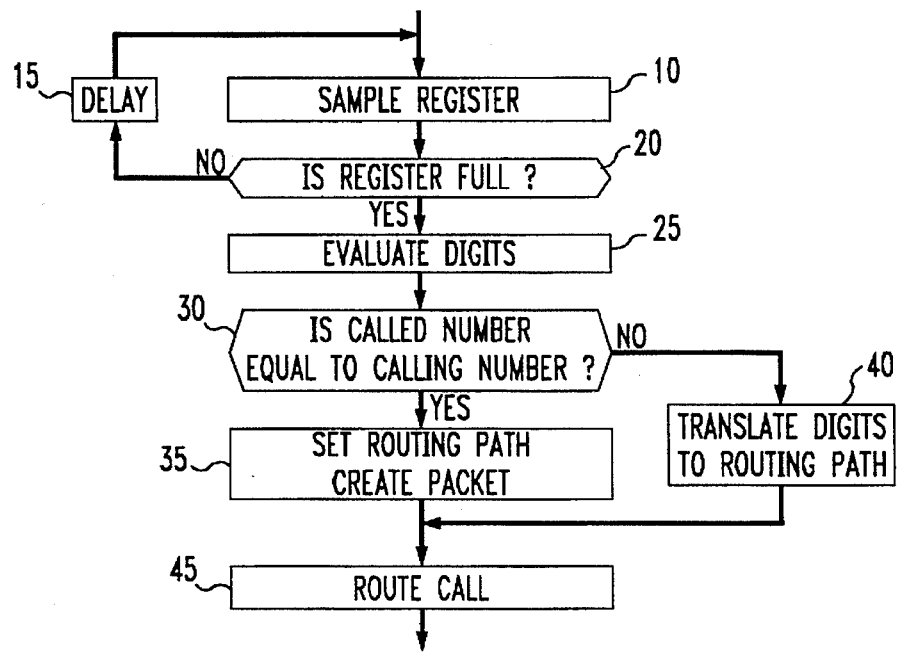
FIG. 1 presents a flowchart for the process that detects the condition of the called party's number being the same as the calling party's number.

In an environment where tile central office employs a stored program controlled switch, realization of this invention requires no addition of physical elements other than a program module. In particular, a conventional central office is coupled to each subscriber line through a line card. The line card includes a digit detector and a register for storing detected digits. The central control regularly samples the registers of all line cards in the system, and proceeds to activate a call establishment module when the appropriate number of digits is present in the register. This is depicted in FIG. 1 where flowchart block 10 samples the register, block 20 determines whether the register is full (i.e., contains an appropriate number of digits), and block 15 provides a delay before the register is resampled. Once it is determined that the appropriate number of digits is present in the register, control passes to block 25 where the digits are evaluated.

In the prior art, the evaluation of the digits is coupled with a set of controls that connect the subscriber line to a desired destination. This may be another line within the same central office, or it may be a trunk that forwards tile call to another central office, perhaps through a long distance network. That set of controls has, in effect, a number translation function (block 40) where the number is translated into call routing information. Once routing is established, the call is appropriately switched by block 45.

In accordance with the principles disclosed herein, block 30 is interposed between blocks 25 and 40. Block 30, in response to the evaluation of digits, determines whether the number called happens to also be the number of the calling party, or the number of the calling party with a preselected prefix (e.g., 1, followed by the calling number, or 10ATT0, etc.). When the determination in block 30 is in the affirmative, control passes to block 25, where the number is appropriately set to the routing information that corresponds to the path leading to the provider of the desired enhanced services, and a packet of information is prepared for transmission to that enhanced services provider. The packet of information includes the number dialed by the calling party, and this information serves as the indication to the service provider regarding the identity of the party seeking the enhanced services. Lastly, block 45 connects the calling party to an Enhanced Telecommunication Services (ETS) machine with which the enhanced services provider implants the enhanced services.

It may be noted that if a user subscribes to a service that takes advantage of the simple and effective dialing approach described above, and it is the only such service that is available, then no additional numbers (e.g., prefix numbers) need to be applied. However, if more than one such service can be accessed by dialing one's own number, then a prefix may be necessary. A number without a prefix may indicate the default enhanced services provider to which the calling party subscribed, and a number with a prefix may indicate a particular non-default enhanced services provider. Alternatively, or in addition, the prefix may designate the set of services that the user wishes to access; e.g., voice only, voice and digital data, digital data only, etc.

As indicated above, a connection made to the provider of enhanced services is, in reality, a connection to a stored program controlled ETS machine. It includes central office capabilities of detecting digits, connecting to telecommunication networks, and providing feature capabilities through program modules.

On feature capability present in the ETS machine is the messaging feature. This feature provides subscribers with a messaging "mailbox" into which messages can be placed when calling parties cannot be connected to the desired party. This may occur because the desired party is not present or because the desired party is busy with another call.

Figure 2:
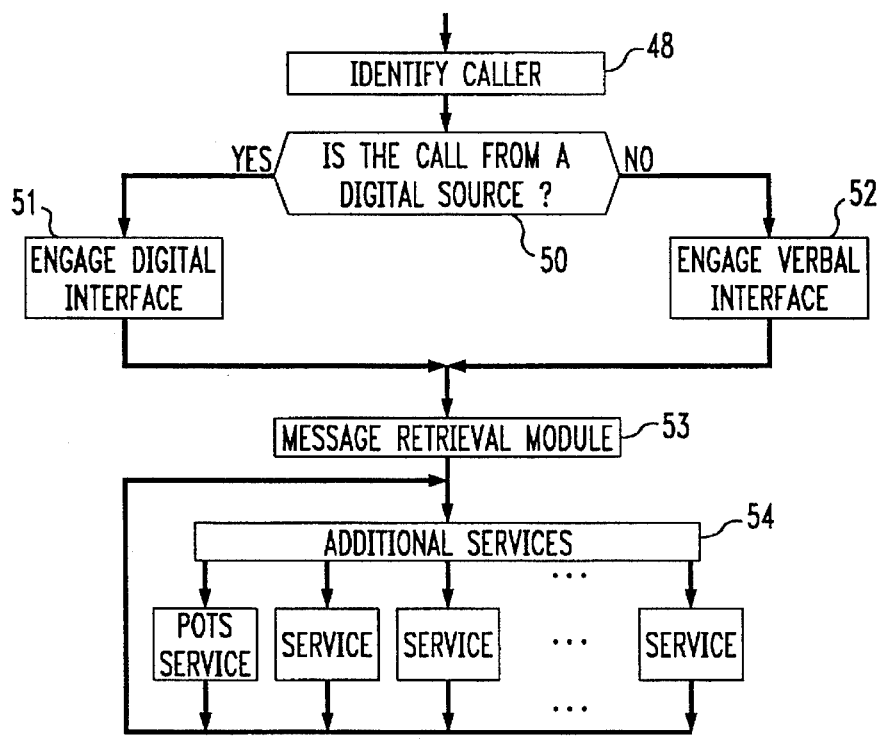
FIG. 2 presents a flowchart for the provision of services in response to the condition of a called party's number being the same as the calling party's number.

When the subscriber gains access to the ETS machine, either because the subscriber wishes to retrieve stored messages, or because the subscriber wishes to access some other enhanced service or feature, the initial packet of information that arrives from the subscriber is the calling number, and that number identifies the subscriber. Following a predetermined confirmation protocol initiated by the ETS machine to confirm that the calling party is the expected subscriber (for example, through the familiar "password" challenge), the ETS machine offers the stored messages to the calling party. Thereafter, the ETS machine proceeds to suggest to the calling party other services or features that the calling party would like to access. This can be tailored to the particular interface that is established with the calling party. It can be sensitive to the calling party's voice responses, to touch-tone signals, or to a stream of bits from a calling party's computer. In other words, a menu is presented and the user selects from the menu. This is depicted in FIG. 2. Block 50 first determines whether the calling party is a source of digital information from a computer or a computer-like device. This, for example, can be accomplished by listening to signals that are characteristic of computer-like devices (e.g., modem tones). Blocks 51 and 52 respond to the determinations of block 50. Block 52, for example, can couple a conventional system that addresses the calling party aurally and responds to touch-tone signals.

Block 53 is the first service block of the ETS machine. It determines whether there are messages stored for the calling party subscriber and, if so, presents the calling party with options for retrieving those messages. When the message retrieval module completes its work, control passes to block 54 where options are made available to the calling party. For example, the calling party may be offered the opportunity to make a POTS call. The instructions to the calling party ,nay simply be "please dial the number you wish to reach". The information is captured by block 55 and the desired service is provided by connecting the calling party to its desired destination. The connection is effected by the ETS machine by launching the call upon the network in the very same way that a central office switch does. Thereafter, control passes back to block 54 to allow repeated access to different services. This allows the user to receive many services after a single initial call to the ETS machine. Of course, the selection in block 54 may direct termination of the call.

It may be noted in passing that the ETS machine does not have to be a physically separate machine from that which constitutes the central office. In other words, a central office that possesses sufficient resources (memory and call processing capabilities) can devote some of those resources to ETS machine functions. In such a circumstance, the central office can be thought of as comprising the ETS machine.

What is claimed:

1. A call handling method comprising the steps of:

detecting when a called number equals a calling number; and in response to the detection, providing a service to the calling party that is other than connecting the calling party to its own number.

2. The method of claim 1 where the service is a coupling of an enhanced telecommunications service machine to the calling party.

3. The method of claim 1 where the service comprises the steps of coupling of an enhanced telecommunications service machine to the calling party and provision of at least one enhanced telecommunications service from a set of enchanced telecommunications services.

4. The method of claim 1 where said service includes provision of recorded messages to the calling party.

5. The method of claim 1 wherein said service includes POTS service.

6. The method of claim 5 where the POTS service includes local and long distance connections to other parties.

7. The method of claim 1 where said service is adapted for interfacing with a modem.

8. The method of claim 1 where said service is adapted for interfacing with a computer.

9. The method of claim 1 where said service includes provision of a menu of subscribed-to services to the user.

10. The method of claim 1 where said service includes a set of subscribed-to services and the step of providing said service includes a step for providing more than one of said subscribed-to services, seriatim.

11. The method of claim 1 where the step of detecting further detects at least one digit prefixed to the calling number.

12. The method of claim 11 where said at least one digit defines the supplier of the service.

13. The method of claim 11 wherein said at least one digit defines a set of subscribed to services.

14. A call handling method comprising the steps of:

detecting when a called number equals a calling number; and in response to the detection, providing a service to the calling party that is other than connecting the calling party to its own number or a call-forwarding translation thereof.

\* \* \* \* \*